(12) United States Patent
Sivakumar et al.

(10) Patent No.: US 10,922,392 B2
(45) Date of Patent: Feb. 16, 2021

(54) SYSTEMS AND METHODS FOR GENERATING AND MANAGING COMPOSITE DIGITAL IDENTITIES

(71) Applicant: Tata Consultancy Services Limited, Mumbai (IN)

(72) Inventors: Narendran Sivakumar, Chennai (IN); Sankaranarayanan Viswanathan, Chennai (IN); Radhika Kannan, Chennai (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 288 days.

(21) Appl. No.: 15/867,149

(22) Filed: Jan. 10, 2018

(65) Prior Publication Data
US 2018/0225434 A1 Aug. 9, 2018

(30) Foreign Application Priority Data
Jan. 20, 2017 (IN) .............................. 201721002310

(51) Int. Cl.
*G06F 21/31* (2013.01)
*G06F 16/955* (2019.01)
(Continued)

(52) U.S. Cl.
CPC .......... *G06F 21/316* (2013.01); *G06F 16/955* (2019.01); *G06F 21/602* (2013.01); *H04L 9/3213* (2013.01)

(58) Field of Classification Search
CPC .... G06F 21/316; G06F 16/955; G06F 21/602; H04L 9/3213
See application file for complete search history.

(56) References Cited

U.S. PATENT DOCUMENTS 8,447,983 B1 * 5/2013 Beck .................... H04L 9/0894
713/172
8,601,602 B1 12/2013 Zheng
(Continued)

OTHER PUBLICATIONS

Hussain et al., "The case for service provider anonymity," The 10th IEEE International Symposium on Signal Processing and Information Technology Year: 2010 | Conference Paper | Publisher: IEEE.*
(Continued)

*Primary Examiner* — Roderick Tolentino
(74) *Attorney, Agent, or Firm* — Finnegan, Henderson, Farabow, Garrett & Dunner, LLP

(57) ABSTRACT

This disclosure relates generally to digital telecommunications, and more particularly to systems and methods for generating and managing composite digital identities. In one embodiment, a system and method for generating and managing digital identities is disclosed. The method includes receiving, from an identity seeker, a request having an identifier associated with an entity, the request includes a context associated with a transaction. An encrypted token corresponding to the identifier is identified from encrypted tokens stored in a database and is further decrypted to obtain context matrix on which analysis is performed with respect to the request. An activity status associated with the transaction is determined based on analysis to generate composite provisional digital identity (CPDI) specific to the transaction. Based on the determined activity status, one of is performed: (i) obtaining a verification message from the entity, wherein the verification message pertains to the transaction performed by entity, and generating a CPDI of the entity based on the verification message; or (ii) generating a composite provisional digital identity of the entity for authorizing the transaction.

18 Claims, 4 Drawing Sheets

(51) Int. Cl.
*G06F 21/60* (2013.01)
*H04L 9/32* (2006.01)

(56) References Cited

U.S. PATENT DOCUMENTS

| | | | |
|---|---|---|---|
| 2005/0172335 A1 | 8/2005 | Aday et al. | |
| 2011/0167479 A1* | 7/2011 | Maes | G06F 21/6281 726/4 |
| 2012/0214444 A1* | 8/2012 | McBride | H04W 12/0605 455/411 |
| 2013/0282582 A1* | 10/2013 | Pereira | G06Q 20/20 705/44 |
| 2014/0245461 A1* | 8/2014 | O'Neill | G06F 21/62 726/28 |
| 2015/0161360 A1* | 6/2015 | Paruchuri | H04N 21/2743 726/27 |
| 2015/0312038 A1* | 10/2015 | Palanisamy | G06F 21/33 713/155 |
| 2015/0332029 A1* | 11/2015 | Coxe | H04L 63/06 726/9 |
| 2016/0224776 A1* | 8/2016 | Leow | G06F 21/32 |
| 2018/0018660 A1* | 1/2018 | Gomes | H04W 12/06 |
| 2018/0241711 A1* | 8/2018 | Snapir | G06Q 10/107 |

OTHER PUBLICATIONS

Pimenta et al., "GlobaliD—Privacy Concerns on a Federated Identity Provider Associated with the Users' National Citizen's Card," 2010 Third International Conference on Advances in Human-Oriented and Personalized Mechanisms, Technologies and Services Year: 2010 | Conference Paper | Publisher: IEEE.*

* cited by examiner

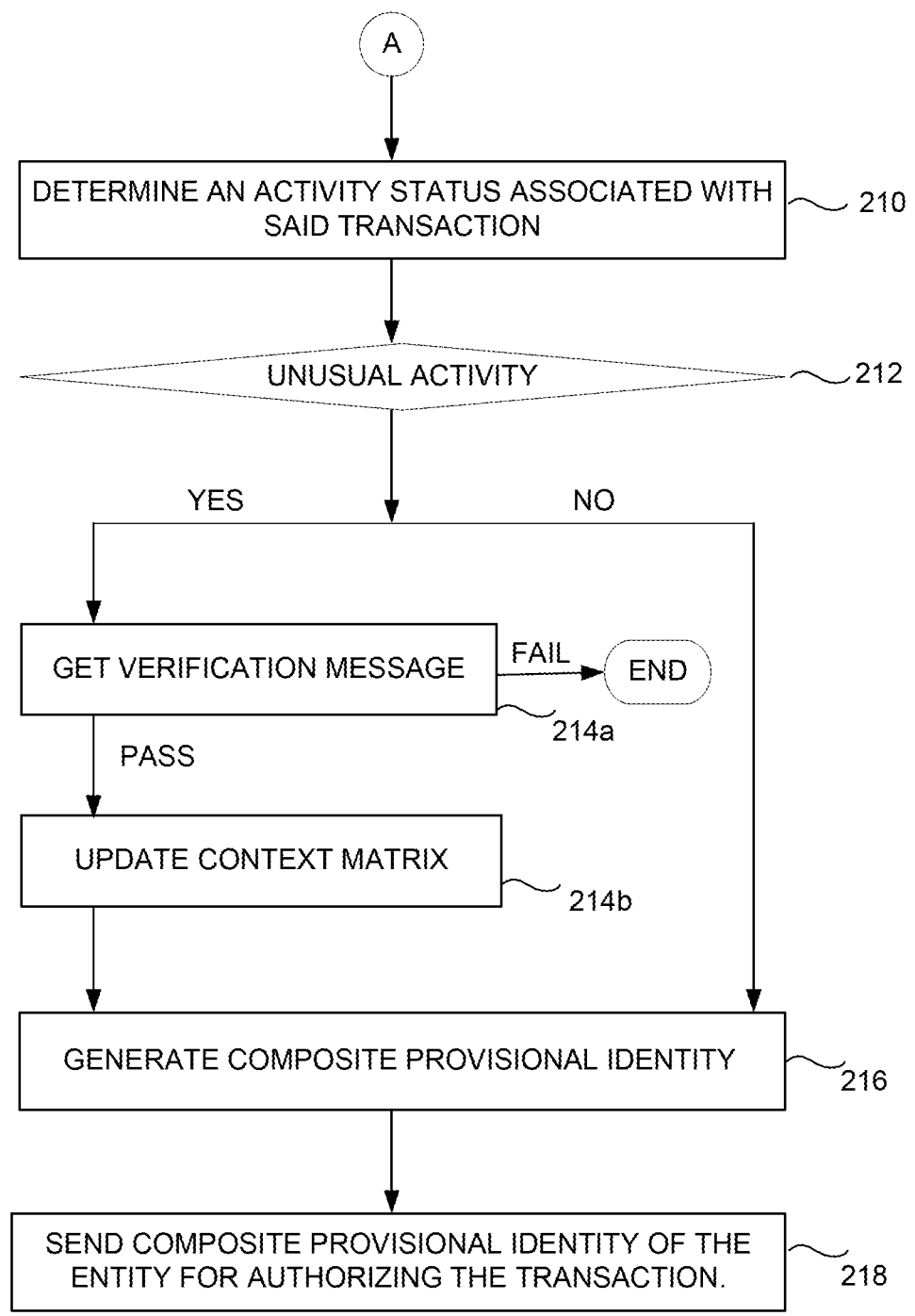
FIG. 2 (Contd)

us 10,922,392 B2

SYSTEMS AND METHODS FOR GENERATING AND MANAGING COMPOSITE DIGITAL IDENTITIES

PRIORITY CLAIM

This U.S. patent application claims priority under 35 U.S.C. § 119 to: India Application No. 201721002310, filed on Jan. 20, 2017. The entire contents of the aforementioned application are incorporated herein by reference.

TECHNICAL FIELD

This disclosure relates generally to digital telecommunications, and more particularly to systems and methods for generating and managing composite digital identities.

BACKGROUND

The inventors here have recognized several technical problems with such conventional systems, as explained below.

In a hyper connected world characterized by widespread or habitual use of devices that have Internet connectivity there is a confluence of internet of people, devices and knowledge. Intensive authentication is crucial in such an eco-system. As there exists connectivity of people, services and devices, all entities of the hyper connected world require digital identity of its own.

Various technologies are existing to provide authentication to the user or device. One such technique is to provide authentication through credentials. However, such credential based authentication is not sufficient to provide authentication covering all scenarios. Moreover, these credentials can be easily hacked thereby increasing the vulnerability of authentication system.

Another technology to provide authentication is through the application of behavioral methods. During an operation, the user behavior history can be stored and the stored information can be used for further authentication of the user. If it is a financial transaction, the transaction history of the particular user can be stored and used further. In another case, the anomalous activity of the device has been detected through behavioral fingerprints, which holds the data related to the user like data collected from the social network, user input, the data provided by GPS, accelerometers, microphones, cameras, timers, touch panels or other indications or combinations of the above said behavioral data.

SUMMARY

Embodiments of the present disclosure present technological improvements as solutions to one or more of the above-mentioned technical problems recognized by the inventors in conventional systems. For example, in one embodiment, a processor implemented method is provided. The method comprising, receiving a request comprising an identifier associated with an entity from an identity seeker, wherein the request comprises a context associated with a transaction being initiated by the entity; Identifying, from one or more encrypted tokens stored in a database, an encrypted token corresponding to the identifier; decrypting the encrypted token to obtain a context matrix; performing an analysis on the context matrix with respect to the request comprising the context associated with the transaction being initiated by the entity; determining an activity status associated with the transaction based on the analysis being performed; based on the determined activity status; performing one of: a) Obtaining a verification message from the entity, wherein the verification message pertains to the transaction being performed by the entity, and generating a composite provisional digital identity of the entity, specific to the transaction based on the verification message; or b) Generating a composite provisional digital identity of the entity specific to the transaction; and sending the composite provisional digital identity of the entity for authorizing the transaction. In one embodiment, the entity is one of person, service or device. In one embodiment, the step of obtaining a verification message from the entity, and generating a composite provisional digital identity of the entity specific to the transaction based on the verification message is performed when the determined activity status is an unusual activity status. In one embodiment, the context matrix is updated based on the unusual activity status. In one embodiment, the context matrix comprises one or more attributes corresponding to one or more transactions being performed by the entity, and wherein the one or more attributes comprises location, time, consumption, subscription, association, and device. In one embodiment, the composite provisional digital identity is generated using one or more registered identifiers stored in the database.

In another embodiment, a computer implemented system is provided. A system comprising a memory storing instructions; one or more communication interfaces; and one or more hardware processors coupled to the memory using the one or more communication interfaces, wherein the one or more hardware processors are configured by the instructions to: receive a request comprising an identifier associated with an entity from an identity seeker, wherein the request comprises a context associated with a transaction being initiated by the entity; Identify from one or more encrypted tokens stored a database, an encrypted token corresponding to the identifier; decrypt the encrypted token to obtain a context matrix; perform an analysis on the context matrix with respect to the request comprising the context associated with the transaction being initiated by the entity; determine an activity status associated with the transaction based on the analysis being performed; based on the determined activity status; performing one of: a) Obtaining a verification message from the entity, wherein the verification message pertains to the transaction being performed by the entity, and generating a composite provisional digital identity of the entity , specific to the transaction based on the verification message; or b) Generating a composite provisional digital identity of the entity specific to the transaction; and send the composite provisional digital identity of the entity for authorizing the transaction. In one embodiment, the entity is one of person, service or device. In one embodiment, the step of obtaining a verification message from the entity, and generating a composite provisional digital identity of the entity specific to the transaction based on the verification message is performed when the determined activity status is an unusual activity status. In one embodiment, context matrix is updated based on said unusual activity status. In one embodiment, the context matrix comprises one or more attributes corresponding to one or more transactions being performed by the entity, and wherein the one or more attributes comprises location, time, consumption, subscription, association, and device. In one embodiment, the composite provisional digital identity is generated using one or more registered identifiers stored in the database.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
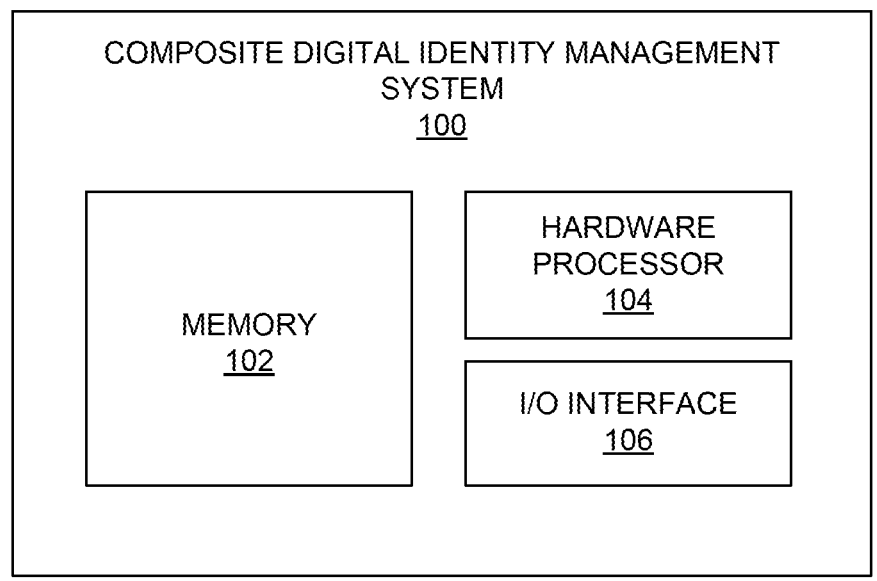
FIG. 1 illustrates an exemplary block diagram of a system for managing composite digital identity according to some embodiments of the present disclosure.

FIG. 1 is a block diagram of a system for composite digital identity management 100 according to an embodiment of the present disclosure. The system 100 comprises a memory 102, a hardware processor 104, and an input/output (I/O) interface 106. Although the exemplary block diagram and the associated description refers to a memory and a hardware processor, it may be understood that one or more memory units and one or more hardware processors may be comprised in the covering array generation system 100. The memory 102 further includes one or more functional modules 108. The memory 102, the hardware processor 104, the input/output (I/O) interface 106, and/or the 108 modules may be coupled by a system bus or a similar mechanism.

The memory 102, may store instructions, any number of pieces of information, and data, used by a computer system, for example the system 100 to implement the functions of the system 100. The memory 102 may include for example, volatile memory and/or non-volatile memory. Examples of volatile memory may include, but are not limited to volatile random access memory (RAM). The non-volatile memory may additionally or alternatively comprise an electrically erasable programmable read only memory (EEPROM), flash memory, hard drive, or the like. Some examples of the volatile memory includes, but are not limited to, random access memory, dynamic random access memory, static random access memory, and the like. Some example of the non-volatile memory includes, but are not limited to, hard disks, magnetic tapes, optical disks, programmable read only memory, erasable programmable read only memory, electrically erasable programmable read only memory, flash memory, and the like. The memory 102 may be configured to store information, data, applications, instructions or the like for enabling the system 100 to carry out various functions in accordance with various example embodiments.

Additionally or alternatively, the memory 102 may be configured to store instructions which when executed by the hardware processor 104 causes the system 100 to behave in a manner as described in various embodiments. The memory 102 stores the functional modules and related information.

The hardware processor 104 may be implemented as one or more microprocessors, microcomputers, microcontrollers, digital signal processors, central processing units, state machines, logic circuitries, and/or any devices that manipulate signals based on operational instructions. Further, the hardware processor 104 may comprise a multi-core architecture. Among other capabilities, the hardware processor 104 is configured to fetch and execute computer-readable instructions or modules stored in the memory 102. The hardware processor 104 may include circuitry implementing, among others, audio and logic functions associated with the communication. For example, the hardware processor 104 may include, but are not limited to, one or more digital signal processors (DSPs), one or more microprocessor, one or more special-purpose computer chips, one or more field-programmable gate arrays (FPGAs), one or more application-specific integrated circuits (ASICs), one or more computer(s), various analog to digital converters, digital to analog converters, and/or other support circuits.

The hardware processor 104 thus may also include the functionality to encode messages and/or data or information. The hardware processor 104 may include, among others a clock, an arithmetic logic unit (ALU) and logic gates configured to support operation of the hardware processor 104. Further, the hardware processor 104 may include functionality to execute one or more software programs, which may be stored in the memory 102 or otherwise accessible to the hardware processor 104.

Figure 2:
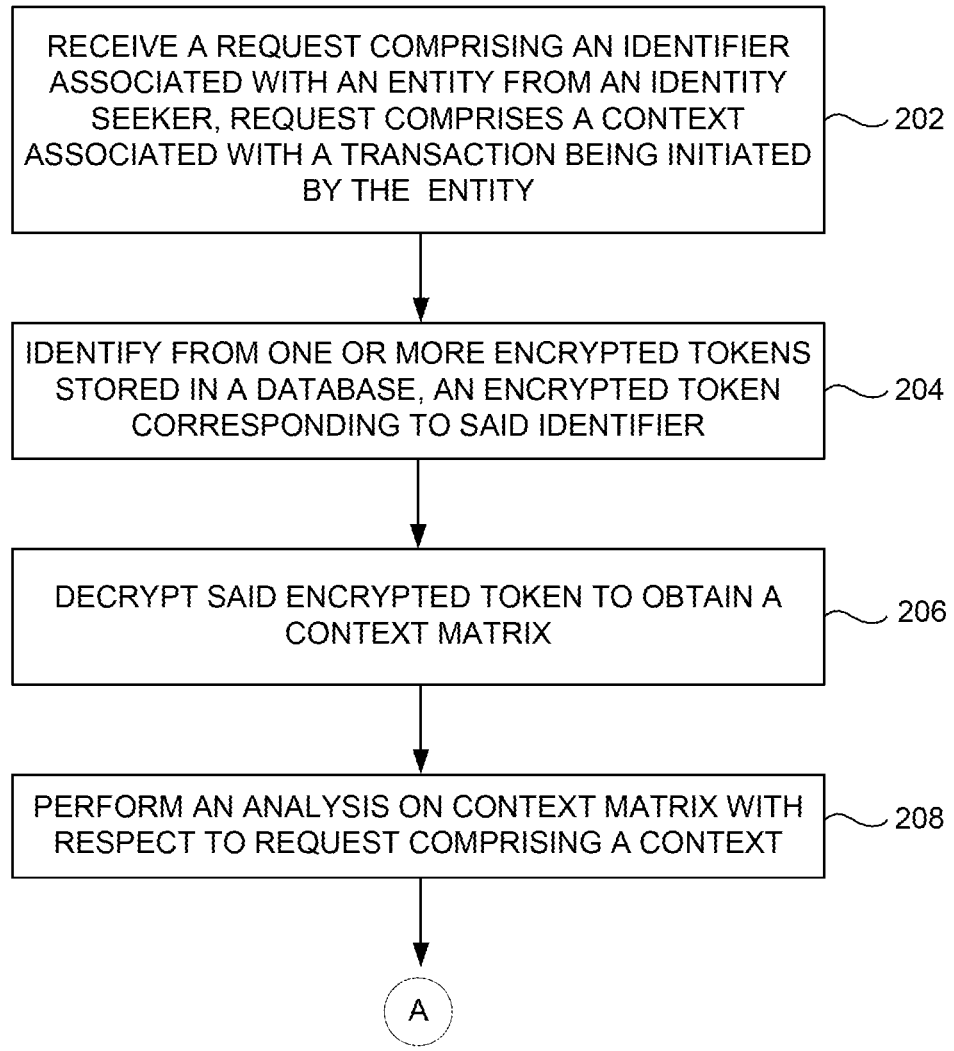
FIG. 2 is a flow diagram illustrating a processor implemented method using the system of FIG. 1 in accordance with some embodiments of the present disclosure.

FIG. 2, with reference to FIG. 1, is a flow diagram illustrating a processor implemented method managing composite digital identity using system 100 of FIG. 1, according to the embodiments as disclosed herein. The steps of the method of the present disclosure will now be explained with reference to the components of the system 100 as depicted in FIG. 1. In step 202, the system receives a request comprising an identifier associated with an entity from an identity seeker, wherein the request comprises a context associated with a transaction being initiated by the entity. In Step 204, from one or more encrypted tokens stored in a database associated with an identity custodian, an encrypted token corresponding to said identifier are identified. In Step 206, the encrypted token is decrypted to obtain a context matrix.

In the present disclosure, the expressions "context matrix" and "context graph" may be used interchangeably.

The Context graph is represented by an ontology model. Context matrix illustrates a graphical representation comprising consumption, subscription, association, device along the X-axis and location and time along y-axis. Further, Consumption comprises the values for Location, Experience, Behavior, Usage; and Subscription comprises values for complaints, services, interactions, payments, demographic; and Association comprises Household, Social, Communities, Influence; and Device comprises the set represented by Mobile, I-Pad, Tablet, Television. Furthermore, location may include but limited to information pertaining to geography, city, and place of said digital identity. Similarly time along y-axis may include but not limited to morning, afternoon, evening, night, late night. Context Graph aggregates entity personas and contextual intelligence. In one embodiment, the usage of context graph features real-time analytics and heuristics to generate the right offer to the customer at the right context. This can be used to steer a company's customer engagement strategy.

Tokenization is important as this enables only the relevant portion of identity is exposed to the requestor for validation. Identity Seeker is an interested entity which requires identity of the entity at play, which in a specific context is the Identity Provider from the identity custodian for purposes of transactions or engagement. In one example embodiment, an interested entity is a retailer, the identity provider is the customer and the Identity custodian is UUID or banks which have performed the action of "Know Your Customer" (KYC). The entity in the value chain can be a service, device, or person. Further, Identity Custodian maintains the relationship with the identity seeker and identity provider. Furthermore, Identity provider is the entity that has a unique id, attached to this unique id are transactions. The transactions include but are not limited to service delivery, engagement, material transactions like buying a service or product/selling a service or product.

A key observation from the method of generating a composite identity is as follows: when a request for an identity is made, a token is created which represents the composite identity of the said entity. It is this token that is exchanged. The token merely confirms the identity of the identity provider to the identity seeker and does not expose the personas which go in to the creation or definition of identity.

In Step 208, analysis is performed on the context matrix with respect to said request comprising said context associated with said transaction being initiated by said entity. In Step 210, activity status associated with the said transaction is determined. In Step 212, if the activity status is found to be an unusual activity status, then the process moves to Step 214a involving obtaining a verification message from the entity in question. In one example embodiment, the identity seeker may verify with the entity in question, i.e. the identity provider, if a transaction, say for example, a banking transaction involving money transferred to a retailer account at a specific time was indeed initiated by the identity provider. The identity provider responds to the verification message by either confirming or denying the said action. If the verification message is positive, or in other words, if the identity provider confirms the verification message then the context is updated in Step 216b.

In Step 212, if the activity status is found to be a usual activity status; or in other words, unusual activity status is determined to be "NO", then Step 216 is performed. In Step 216, composite provisional digital identity is generated. In Step 218, the composite provisional digital identity of the entity thus generated is sent for authorizing the transaction.

The composite provisional digital identity driven by personas. It is a combination of multiple identities including but not limited to a device, a service, or a person. Personas in this technical context represents a behavioral characteristic, Further, these personas are dynamic entities which are continuously generated and enriched for people, services and devices that represent the behaviors respectively. These personas are in turn associated to a person, service and devices respectively as a composite identity. The composite identity will have associated personas and meta-attributes. Meta attributes describe when personas are active and can be used as an identifier, and under what context.

It is to be highlighted that the identity seeker merely authenticates the token of the entity or the identity provider. It is the identity provider which determines whether token can be automatically exchanged or a next level authentication is required. Further, the entity in question or the identity provider can also protect tokens representing its composite digital identity with end user agreements that mandate under what specific conditions and context the tokens are seamless exchanged. Besides that in certain scenarios, tokens are given a lifecycle to indicate how long the particular identity is valid. This is to ensure the identity is not perpetual and is consistently relevant. Furthermore, if the persona active in the composite identity is consistent with the context in which the identity seeker has invoked, the identity is seamlessly provided in the form of tokens.

In one embodiment, Table 1 herein below provides details on the list of analytical requirements to identify the subscription pattern of a customer present in a context matrix.

TABLE 1

Details related to list of analytical requirements to identify the subscription pattern of a customer.

| | |
|---|---|
| Analytics Requirements ID | SUB_001 |
| Location Analytics Requirement | Location based Subscription (Wi Fi, Speed Boost etc.) |
| Description | Identify the location from which Telco Products are subscribed. |
| Outcome | Products Subscribed and Corresponding location |
| Analytics Requirements ID | SUB_002 |
| Location Analytics Requirement | Location based offer uptake |
| Description | Identify the success rate of location based marketing offer. |
| Outcome | Get details on Uptake Rate and Revenue Earned |
| Analytics Requirements ID | SUB_003 |
| Location Analytics Requirement | Location based payment preferences |
| Description | Identify the preferences of payment. |
| Outcome | Payment options identified based on location |
| Analytics Requirements ID | SUB_004 |
| Location Analytics Requirement | Location based device in use |
| Description | Identify the device capabilities and location details. |
| Outcome | Insight details on device capabilities and to assess the scope for introducing new products. |

Similarly, in another embodiment, the data-internet usage pattern corresponding to consumption parameter is characterized in Table 2 provided herein below.

TABLE 2

Details related to list of analytical requirements to identify the consumption pattern of a customer, more specifically corresponding to data-internet usage pattern.

| | |
|---|---|
| ID | CUS_001 |
| Location Analytics Requirement | List of Non streaming/Streaming websites viewed (URL) |
| Description | Identify the list of websites or URL's the customer has viewed. |
| Outcome | Get the frequency in which the customer visited each websites, identify the category of website (Online shopping, games, Social, etc.) |
| Analytics Requirements ID | CUS_002 |
| Location Analytics Requirement | Type of content |
| Description | Identify the type of content viewed e.g. Movies, games, sports etc. |

TABLE 2-continued

Details related to list of analytical requirements to identify the consumption pattern of a customer, more specifically corresponding to data-internet usage pattern.

| | |
|---|---|
| Outcome | Get the set of attributes for classifying the usage e.g. Movies, Games, etc. |

Furthermore, in yet another embodiment, the TV-viewing pattern corresponding to consumption parameter is characterized in Table-3 provided herein below.

TABLE 3

Details related to list of analytical requirements to identify the consumption pattern of a customer, more specifically corresponding to TV-viewing pattern.

| | |
|---|---|
| Analytics Requirements ID | CUS_007 |
| Location Analytics Requirement | Channels viewed |
| Description | List of channels viewed |
| Outcome | List of channels viewed during time of the day, public holidays and the like, with the details that identify the category of channel sports, cartoon, movie etc. |
| Analytics Requirements ID | CUS_008 |
| Location Analytics Requirement | Frequency of surfing channels |
| Description | List of frequently surfed channels. |
| Outcome | Get the frequency in which the customer surf channels |
| Analytics Requirements ID | CUS_009 |
| Location Analytics Requirement | Program viewed duration |
| Description | Identify the duration taken by user in each channel |
| Outcome | Get the duration of consumption for each of the programs. Use the Genre information to classify the customer as movie buff, sports person, etc... |
| Analytics Requirements ID | CUS_010 |
| Location Analytics Requirement | Devices used for Consumption |
| Description | Get the list of device used to view the content |

Furthermore, in yet another embodiment, the corresponding Location parameter is characterized in Table-4 provided herein below.

TABLE 4

Details related to list of analytical requirements to identify location pattern of a customer.

| | |
|---|---|
| Analytics Requirements ID | LOC_001 |
| Location Analytics Requirement | Customer presence at a point in time |
| Description | Identify the customers presence at a specific place, time and frequency |
| Outcome | Get the details about the place like mall, stadium, theatre and the like, along with time and frequency of visits |
| Analytics Requirements ID | LOC_002 |
| Location Analytics Requirement | List of Non streaming/Streaming websites viewed (URL) |
| Description | List of websites or URLs the customer has viewed at each location. |
| Outcome | Get the different locations and frequency of customers' availability in a location and the frequency in which the customer visited each websites, identify the category of website Customer, decide the probability of Cross sell, upsell opportunities. |

In an embodiment of the present disclosure, when an identification is requested, the Identity provider is expected to expose the identity to the Identity Seeker without any explicit authentication. In one embodiment, if the context of the request is different as evidenced from the personas active within the composite index, the identity provider would go in for manual authentication. Authentication in this scenario can be a person key in credentials, or a service going through an elaborate key exchange mechanism or a device exposing its security certificates.

Figure 3:
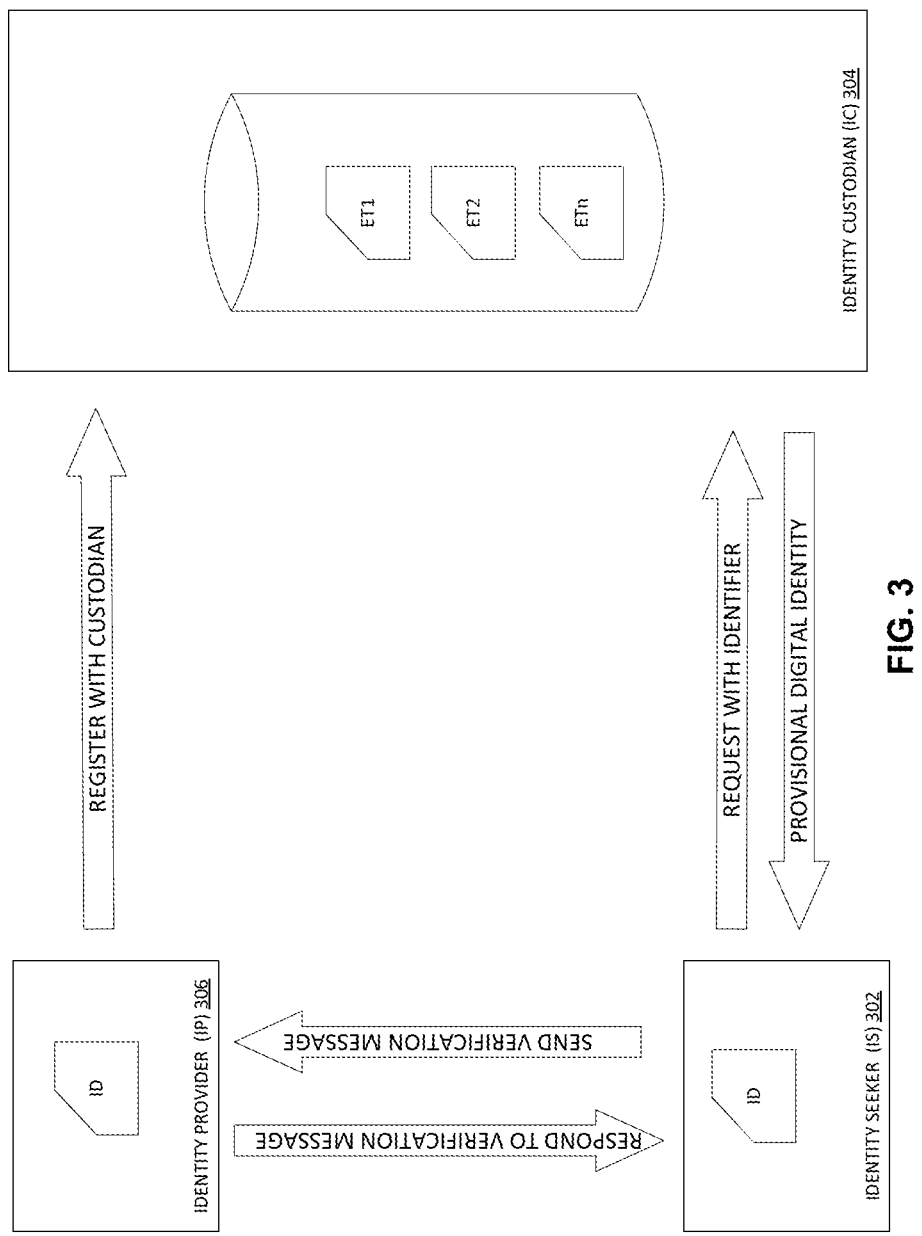
FIG. 3 is a diagram depicting the interaction between various constituent entities in the said system viz. Identity Seeker, Identity Provider and Identity Custodian according to an embodiment of the present disclosure.

FIG. 3, with reference to FIG. 2, is an indicative diagram representing the interaction between various constituent entities in the said system viz. Identity Seeker, Identity Provider and Identity Custodian according to the embodiments as disclosed herein. An Identity Seeker—IS (302) initiates a request comprising an identifier associated with an entity. This request comprises a context associated with a transaction being initiated by the entity, or the Identity Provider—IP (306). The Identity Custodian IC—(304) contains a database with encrypted tokens (ET1, ET2, ET3, . . . ,ETn). The Identity Custodian IC—(304) identifies an encrypted token stored in a database corresponding to the identifier. The encrypted token thus identified with reference to the entity in a specific context is decrypted to obtain a context matrix. Analysis is performed on the context matrix thus obtained and an activity status is determined. The activity is verified with the Identity Provider—IP (306). It is determined whether it is a usual activity or an unusual activity. If it is a usual activity, then the Identity Provider—IP (306) confirms such verification message to the Identity Seeker—IS (302) and the composite provisional digital identity (CPDI) is generated and the transaction authorized. On the other hand, if it is an unusual activity, then the Identity Provider—IP (306) denies the verification message thus resulting in updating the context matrix. In one embodiment, the Identity Provider—IP (306) registers with the Identity Custodian—IC (304).

The above cited interactions are indicative and representative and not exhaustive so as to cover all the scenarios. These examples are presented herein for purposes of illustration, and not limitation.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A processor-implemented method, comprising:
   receiving a request comprising an identifier associated with an entity from an identity seeker, wherein said request comprises a context associated with a transaction being initiated by said entity;
   identifying, from one or more encrypted tokens stored in a database, an encrypted token corresponding to said identifier;
   decrypting said encrypted token to obtain a context matrix; performing an analysis on said context matrix with respect to said request comprising said context associated with said transaction being initiated by said entity;
   determining an activity status associated with said transaction based on said analysis being performed;
   based on said determined activity status; performing:
   a) Obtaining a verification message from said entity, wherein said verification message pertains to said transaction being performed by said entity, and generating a composite provisional digital identity of said entity, specific to said transaction based on said verification message, and wherein the composite provisional digital identity of the entity is sent to the identity seeker for authorizing the transaction:
   b) Creating a persona representing a behavioral characteristic based on the composite provisional digital identity of said entity, wherein said persona is dynamic and is generated on a continual basis, and wherein the composite provisional digital identity confirms the identity of the entity to the identity seeker and does not expose the
   persona of the entity to the identity seeker: and
   c) Generating real time analytics and heuristics to provide a context and an offer specific to said transaction.

2. The method of claim 1, wherein entity is one of person, service or device.

3. The method of claim 1, wherein the step of obtaining a verification message from said entity, and generating a composite provisional digital identity of said entity specific to said transaction based on said verification message is performed based on said determined activity status.

4. The method of claim 3, further comprising updating said context matrix based on said determined activity status.

5. The method of claim 1, wherein said context matrix comprises one or more attributes corresponding to one or more transactions being performed by said entity, and wherein said one or more attributes comprises location, time, consumption, subscription, association, and device.

6. The method of claim 1, wherein said composite provisional digital identity is generated using one or more registered identifiers stored in said database.

7. A system comprising:
   a memory storing instructions;
   one or more communication interfaces; and
   one or more hardware processors coupled to said memory using said one or more communication interfaces, wherein said one or more hardware processors are configured by said instructions to:
   receive a request comprising an identifier associated with an entity from an identity seeker, wherein said request comprises a context associated with a transaction being initiated by said entity;
   identify from one or more encrypted tokens stored a database, an encrypted token corresponding to said identifier;
   decrypt said encrypted token to obtain a context matrix; perform an analysis on said context matrix with respect to said request comprising said context associated with said transaction being initiated by said entity;
   determine an activity status associated with said transaction based on said analysis being performed; based on said determined activity status; performing:
   a) Obtaining a verification message from said entity, wherein said verification message pertains to said transaction being performed by said entity, and generating a composite provisional digital identity of said entity, specific to said transaction based on said verification message, and wherein the composite provisional digital identity of the entity is sent to the identity seeker for authorizing the transaction;
b) Creating a persona based representing a behavioral characteristic on the composite provisional digital identity of said entity, wherein said persona is dynamic and is generated on a continual basis, and wherein the composite provisional digital identity confirms the identity of the entity to the identity seeker and does not expose the persona of the entity to the identity seeker; and
c) Generating real time analytics and heuristics to provide a context and an offer specific to said transaction.

8. The system of claim 7, wherein entity is one of person, service or device.

9. The system of claim 7, wherein the step of obtaining a verification message from said entity, and generating a composite provisional digital identity of said entity specific to said transaction based on said verification message is performed based on said determined activity status.

10. The system of claim 9, wherein said context matrix is updated based on said determined activity status.

11. The system of claim 7, wherein said context matrix comprises one or more attributes corresponding to one or more transactions being performed by said entity, and wherein said one or more attributes comprises location, time, consumption, subscription, association, and device.

12. The system of claim 7, wherein said composite provisional digital identity is generated using one or more registered identifiers stored in said database.

13. A non-transitory computer-readable medium having embodied thereon a computer program for executing a method comprising:
receiving a request comprising an identifier associated with an entity from an identity seeker, wherein said request comprises a context associated with a transaction being initiated by said entity;
identifying, from one or more encrypted tokens stored in a database, an encrypted token corresponding to said identifier;
decrypting said encrypted token to obtain a context matrix; performing an analysis on said context matrix with respect to said request comprising said context associated with said transaction being initiated by said entity;
determining an activity status associated with said transaction based on said analysis being performed;
based on said determined activity status; performing:
a) Obtaining a verification message from said entity, wherein said verification message pertains to said transaction being performed by
said entity, and generating a composite provisional digital identity of said entity, specific to said transaction based on said verification message, and wherein the composite provisional digital identity of the entity is sent to the identity seeker for authorizing the transaction;
b) Creating a persona representing a behavioral characteristic based on the composite provisional digital identity of said entity, wherein said persona is dynamic and is generated on a continual basis, and wherein the composite provisional digital identity of the entity is sent to the identity seeker for authorizing the transaction; and
c) Generating real time analytics and heuristics to provide a context and an offer specific to said transaction.

14. The one or more non-transitory machine readable information storage mediums of claim 13, wherein entity is one of person, service or device.

15. The one or more non-transitory machine readable information storage mediums of claim 13, wherein the step of obtaining a verification message from said entity, and generating a composite provisional digital identity of said entity specific to said transaction based on said verification message is performed based on said determined activity status.

16. The one or more non-transitory machine readable information storage mediums of claim 15, further comprising updating said context matrix based on said determined activity status.

17. The one or more non-transitory machine readable information storage mediums of claim 13, wherein said context matrix comprises one or more attributes corresponding to one or more transactions being performed by said entity, and wherein said one or more attributes comprises location, time, consumption, subscription, association, and device.

18. The one or more non-transitory machine readable information storage mediums of claim 13, wherein said composite provisional digital identity is generated using one or more registered identifiers stored in said database.

* * * * *